(12) United States Patent  (10) Patent No.: US 6,511,205 B1
Predd                      (45) Date of Patent:     Jan. 28, 2003

(54) REAR LIGHTING BACKPLATE

(75) Inventor: Patrick H. Predd, Wixom, MI (US)

(73) Assignee: Elco Textron Inc., Rockford, IL (US)

(*) Notice: Subject to any disclaimer, the term of this patent is extended or adjusted under 35 U.S.C. 154(b) by 30 days.

(21) Appl. No.: 09/825,108

(22) Filed: Apr. 3, 2001

Related U.S. Application Data

(60) Provisional application No. 60/194,436, filed on Apr. 4, 2000.

(51) Int. Cl.[7] .............................. F21S 8/00; H01R 33/02
(52) U.S. Cl. ....................... 362/249; 362/226; 439/672
(58) Field of Search ................................ 362/226, 543, 362/544, 548, 549; 439/699.1, 699.2, 336, 337, 672, 673

(56) References Cited

U.S. PATENT DOCUMENTS 5,060,121 A * 10/1991 Cunningham et al. ....... 362/548
5,536,175 A *  7/1996 Forish ..................... 439/699.1
5,664,870 A *  9/1997 Uchida et al. ............... 362/226

* cited by examiner

Primary Examiner—Alan Cariaso
(74) Attorney, Agent, or Firm—Trexler, Bushnell, Giangiorgi, Blackstone & Marr, Ltd.

(57) ABSTRACT

A rear lighting backplate that includes a backplate lower which is engaged with a backplate upper. A lead frame is sandwiched between the backplate lower and backplate upper. The backplate lower includes a receptacle for receiving a wire harness, and the backplate upper includes one or more integral bulb sockets which are configured to receive bulbs. The lead frame conductively engages each bulb which is engaged with the backplate upper and conductively engages the wire harness which is engaged in the receptacle on the backplate lower. Preferably, the lead frame includes clips for conductively engaging and retaining the bulbs in the bulb sockets. The backplate is preferably configured for selective engagement and disengagement from a lamp housing. Preferably, the backplate provides a sealing surface around each bulb for sealing with the lamp housing when the backplate is engaged therewith. To change a bulb which has burned out, one disengages the backplate from the lamp housing, disengages the burned out bulb from the backplate upper and lead frame, and installs a fresh bulb in the same location (i.e., installs the bulb in the same bulb socket, thus engaging the fresh bulb with the backplate upper and lead frame), and then re-engages the backplate with the lamp housing.

31 Claims, 8 Drawing Sheets

REAR LIGHTING BACKPLATE

RELATED APPLICATION

This application claims the benefit of U.S. Provisional Application Ser. No. 60/194,436, filed Apr. 4, 2000.

BACKGROUND

The present invention relates generally to rear lighting backplates used in automobiles for rear/tail lamps, and relates more specifically to a rear lighting backplate that includes one or more integral bulb sockets.

In one type of prior art rear lighting system for automobiles, a rear lamp housing is provided on each side of the automobile—one at the rear of the automobile on the driver's side, and another at the rear of the automobile on the passenger's side. The rear lamp housings contain the rear lamps of the automobile, such as the brake/tail lamps and reverse lamps. Each housing includes a plurality of apertures for receiving bulb sockets, and each bulb socket includes its own bundle of electrical wires (i.e., a wire harness) which engages a lamp or bulb. The electrical wires effectively connect the lamp to the automobile's electrical system. To change a lamp which has burned out, one must pull the respective bulb socket out from the corresponding aperture in the housing, replace the bulb, and then re-install the bulb socket in the aperture in the housing. A disadvantage to this prior art system is the fact that there is a bundle of electrical wires provided for each bulb. Additionally, each aperture in the housing provides a possible point of entry for moisture to invade the housing. It is desirable to keep the inside of the housing generally moisture-free in order to prevent condensation in the lamp lens.

An improvement to the system described above provides that a backplate is secured to the housing. The backplate includes a receptacle for receiving a main wire harness, and a lead frame is embedded in the backplate. The backplate is configured to carry a plurality of bulb sockets. Specifically, the backplate includes a plurality of apertures or orifices for receiving removable (e.g. twist-in, snap-in) bulb sockets. Each removable bulb socket includes a set of electrical contacts which connect with the lead frame when the bulb socket is installed in the corresponding aperture in the backplate. Hence, the improved system provides that a plurality of bulbs can be connected to the automobile's electrical system using a single bundle of electrical wires (i.e., a single wire harness) which engages the backplate. Hence, all of the bulbs in the housing can be connected to the automobile's electrical system via a single multiple-pin connector. Therefore, this system provides an improvement over the system described first hereinabove.

However, the improved system includes a plurality of removable sockets—one for each bulb—and each socket is formed of multiple pieces and is relatively expensive. Additionally, each is relatively awkward to install in the backplate. Because each removable socket must be configured to mate with the backplate with a watertight seal to prevent condensation on the inside of the lamp lens, each removable socket includes a sealing member which engages against the edge of the corresponding aperture in the backplate. The engagement between the sealing member of the removable socket and the edge of the aperture often makes it relatively difficult to remove/install the socket. Additionally, as with the system described first hereinabove, the improved system provides a plurality of apertures leading to the housing, each of which provides a possible moisture leak path into the lamp lens.

OBJECTS AND SUMMARY

A general object of an embodiment of the present invention is to provide a rear lighting backplate that includes one or more bulb sockets which are integral with the backplate.

A further object of an embodiment of the present invention is to provide a rear lighting backplate that is readily removable from a rear lamp housing in an automobile, such that one or more bulbs retained on the backplate can be changed.

A still further object of an embodiment of the present invention is to provide a rear lighting backplate that includes one or more bulb sockets on one side of the backplate, and a receptacle for receiving a wire harness on an opposite side of the backplate.

Briefly, and in accordance with at least one of the foregoing objects, an embodiment of the present invention provides a rear lighting backplate that includes a backplate lower which is engaged with a backplate upper. A lead frame is sandwiched between the backplate lower and backplate upper. The backplate lower includes a receptacle for receiving a wire harness, and the backplate upper includes one or more integral bulb sockets which are configured to receive bulbs. The lead frame conductively engages each bulb which is engaged with the backplate upper and conductively engages the wire harness which is engaged in the receptacle on the backplate lower. Preferably, the lead frame includes clips for conductively engaging and retaining the bulbs in the bulb sockets. The backplate is preferably configured for selective engagement and disengagement from a lamp housing. Preferably, the backplate provides a sealing surface around each bulb for sealing with the lamp housing when the backplate is engaged therewith. To change a bulb which has burned out, one disengages the backplate from the lamp housing, disengages the burned out bulb from the backplate upper and lead frame, and installs a fresh bulb in the same location (i.e., installs the bulb in the same bulb socket, thus engaging the fresh bulb with the backplate upper and lead frame), and then re-engages the backplate with the lamp housing.

BRIEF DESCRIPTION OF THE DRAWINGS

The present invention and the advantages thereof will become more apparent upon consideration of the following detailed description when taken in conjunction with the accompanying drawings of which.

DESCRIPTION

Figure 1:
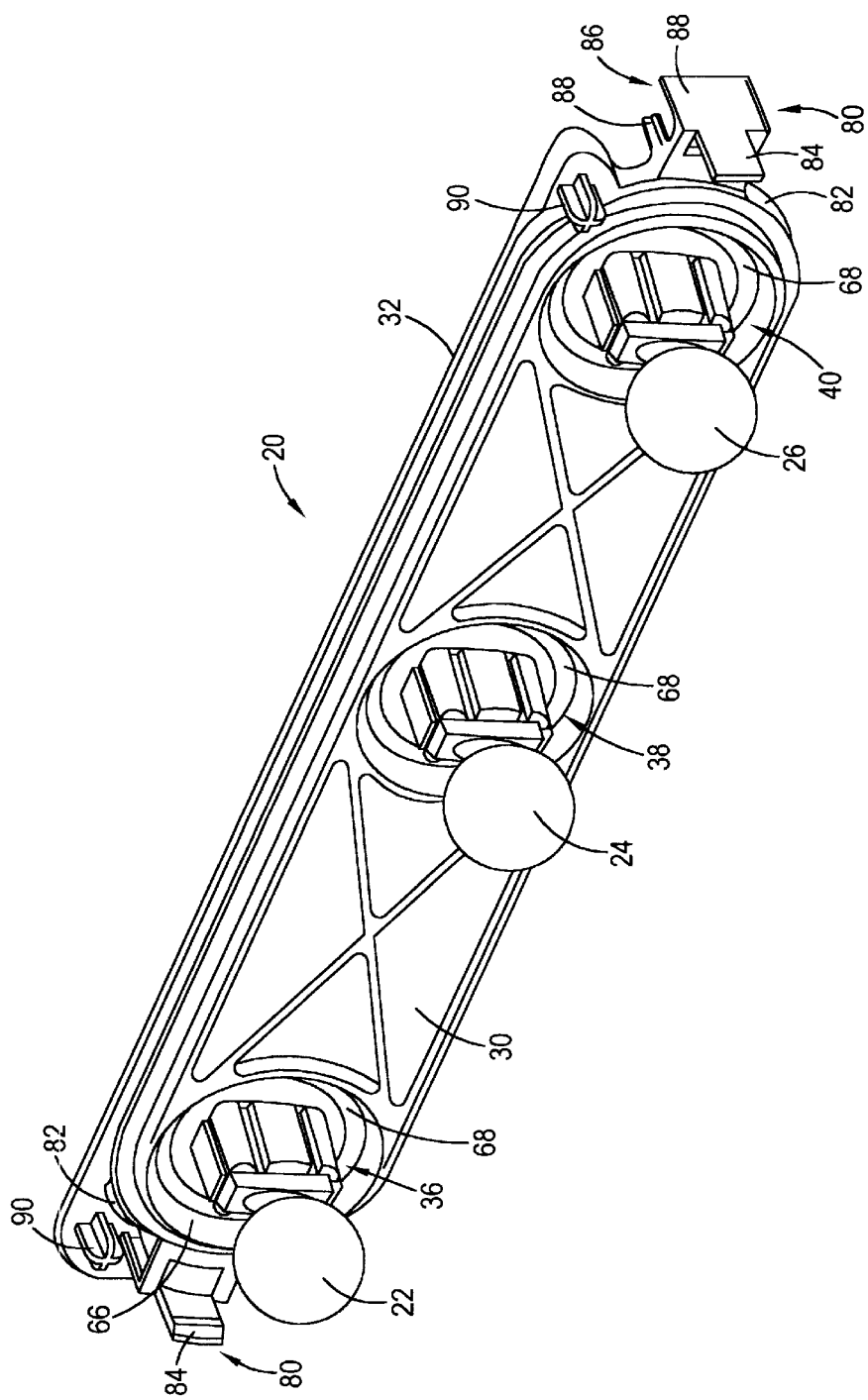
FIG. 1 is a right, top perspective view of a backplate which is in accordance with an embodiment of the present invention, showing three bulbs engaged with a backplate upper.
Figure 2:
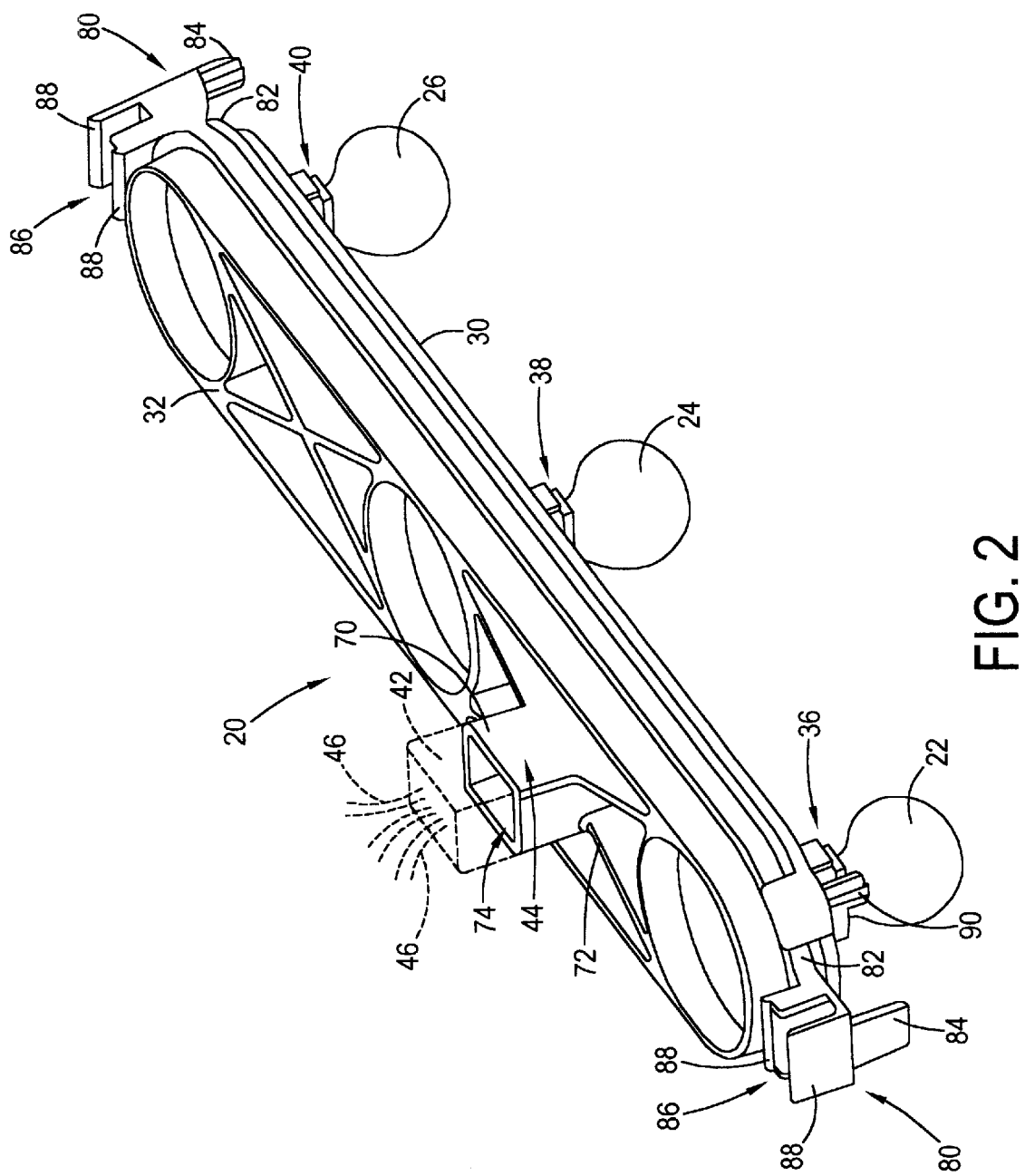
FIG. 2 is another perspective view of the backplate illustrated in FIG. 1, showing a wire harness (in phantom) engaged in a receptacle in a backplate lower.
Figure 3:
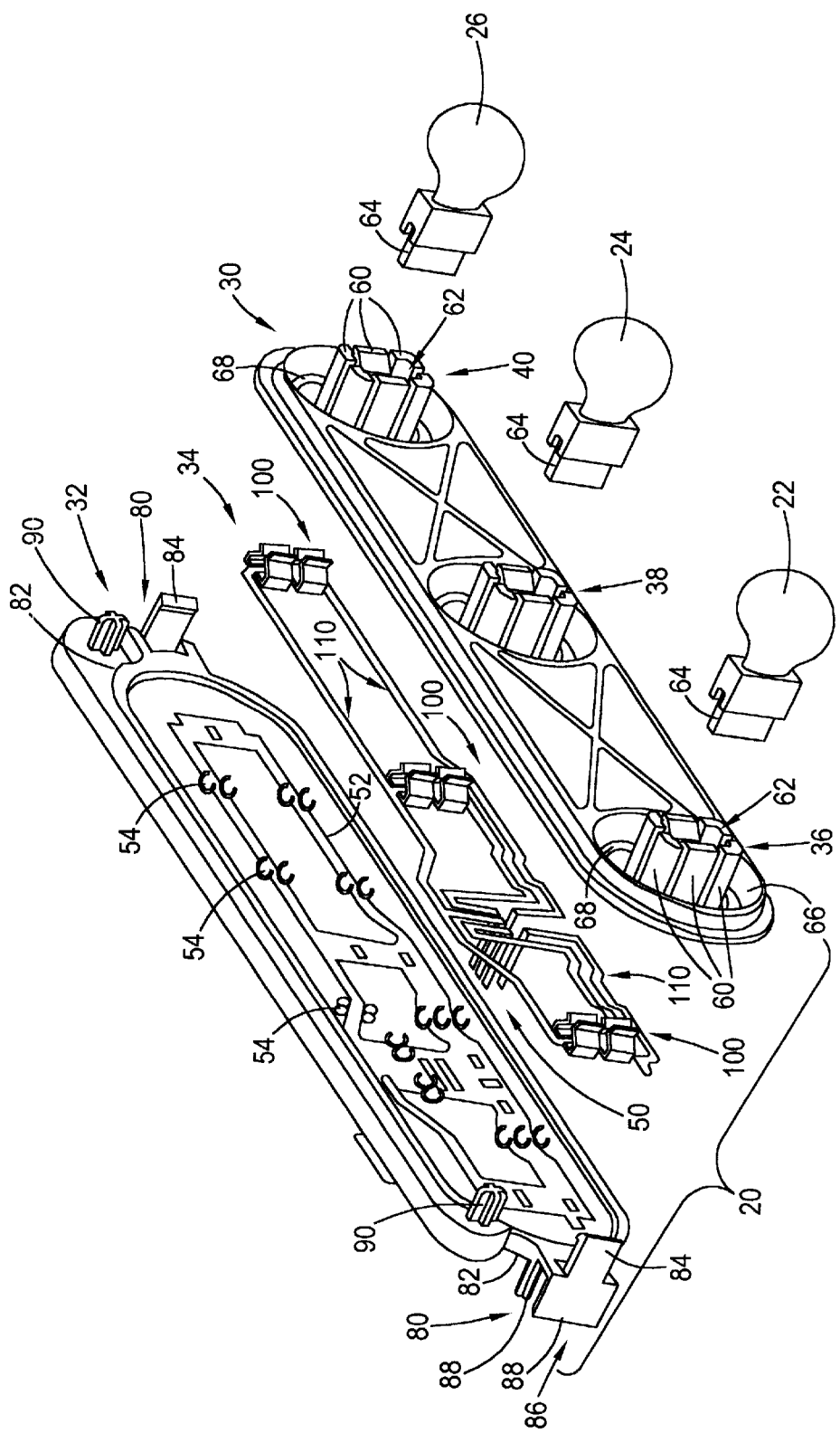
FIG. 3 is an exploded perspective view of the backplate illustrated in FIGS. 1 and 2, showing a lead frame which is sandwiched between the backplate upper and backplate lower.
Figure 6:
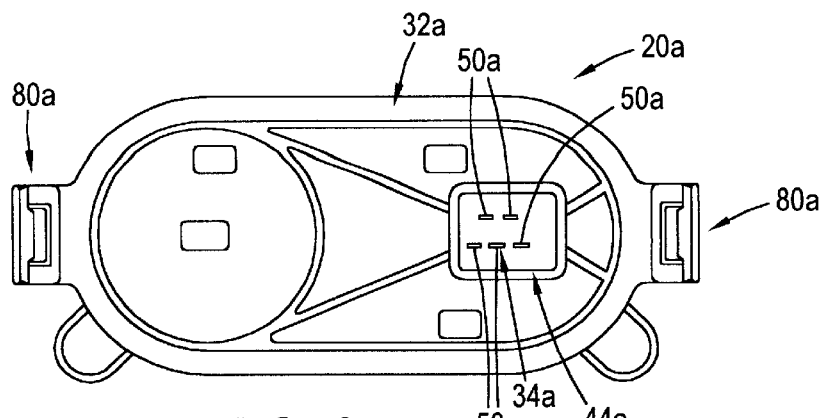
FIG. 6 is a top plan view of a backplate which is in accordance with another embodiment of the present invention.
Figure 7:
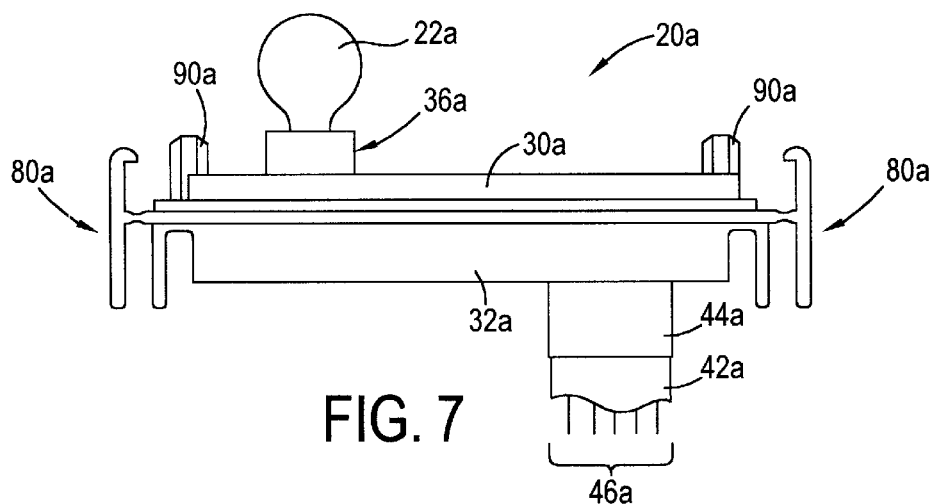
FIG. 7 is a side elevational view of the backplate illustrated in FIG. 6.
Figure 8:
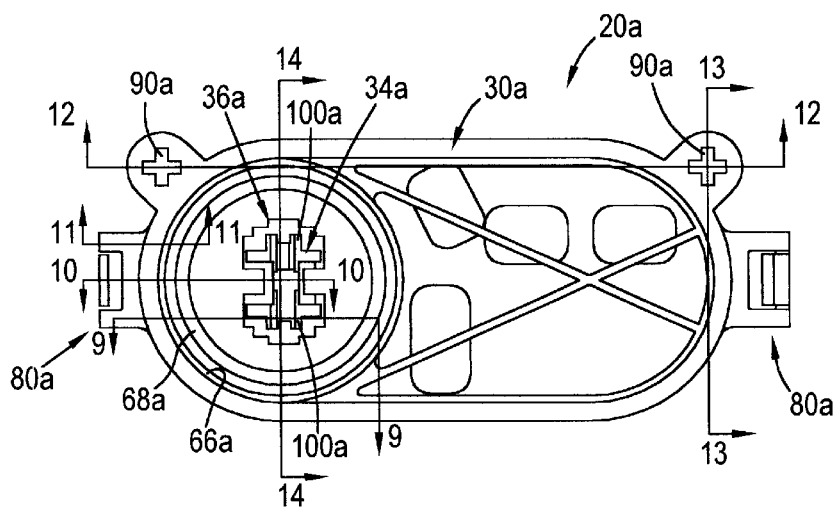
FIG. 8 is a bottom plan view of the backplate illustrated in FIG. 6.

FIGS. 1–3 illustrate a backplate 20 which is in accordance with one embodiment of the present invention, wherein the backplate 20 is configured to hold three bulbs 22, 24, 26, and FIGS. 6–8 illustrate a backplate 20a which is in accordance with another embodiment of the present invention, wherein the backplate 20a is configured to hold a single bulb 22a. The backplate 20 illustrated in FIGS. 1–3 will be described first, and then the backplate 20a illustrated in FIGS. 6–8 will be described, emphasizing only the differences between the two since the second backplate (20a) is very similar to the first (20).

The backplate 20 illustrated in FIGS. 1–3 is comprised of three pieces—a backplate upper 30, a backplate lower 32 and a leadframe 34. As shown in FIGS. 1 and 2, the backplate upper 30 is secured to the backplate lower 32. While the backplate upper 30 is configured to hold three bulbs 22, 24, 26 in corresponding bulb sockets 36, 38, 40, the backplate lower 32 is configured to receive a wire harness 42 (shown in phantom in FIG. 2) in a receptacle 44, where the wire harness 42 receives a plurality of electrical wires 46 which are connected to an automobile's electrical system and the wire harness 42 has a set of electrical contacts or clips therein for conductively connecting the electrical wires to corresponding contacts or extensions 50 in the receptacle 44 (see FIG. 3).

As shown in FIG. 3, a leadframe 34 is sandwiched between the backplate upper 30 and the backplate lower 32. Preferably, the backplate lower 32 has a recess 52 and protrusions 54 or some other structure which generally corresponds with the leadframe 34. The backplate upper 30 may also have structure which generally corresponds with the leadframe 34. Preferably, the backplate upper 30 and backplate lower 32 are secured to each other such that the leadframe 34 is generally encapsulated between the backplate upper 30 and the backplate lower 32. Ideally, the leadframe 34 is exposed only in the bulb sockets 36, 38, 40 on the backplate upper 30 and in the receptacle 44 on the backplate lower 32. Both the backplate upper 30 and backplate lower 32 are preferably formed of plastic, and the leadframe 34 is preferably formed of a conductive material, such as a metal (for example, copper). The leadframe 34 is configured to conductively and electrically connect the electrical wires 46 of the wire harness 42 to the bulbs 22, 24, 26 which are engaged in the bulb sockets 36, 38, 40.

Figure 4:
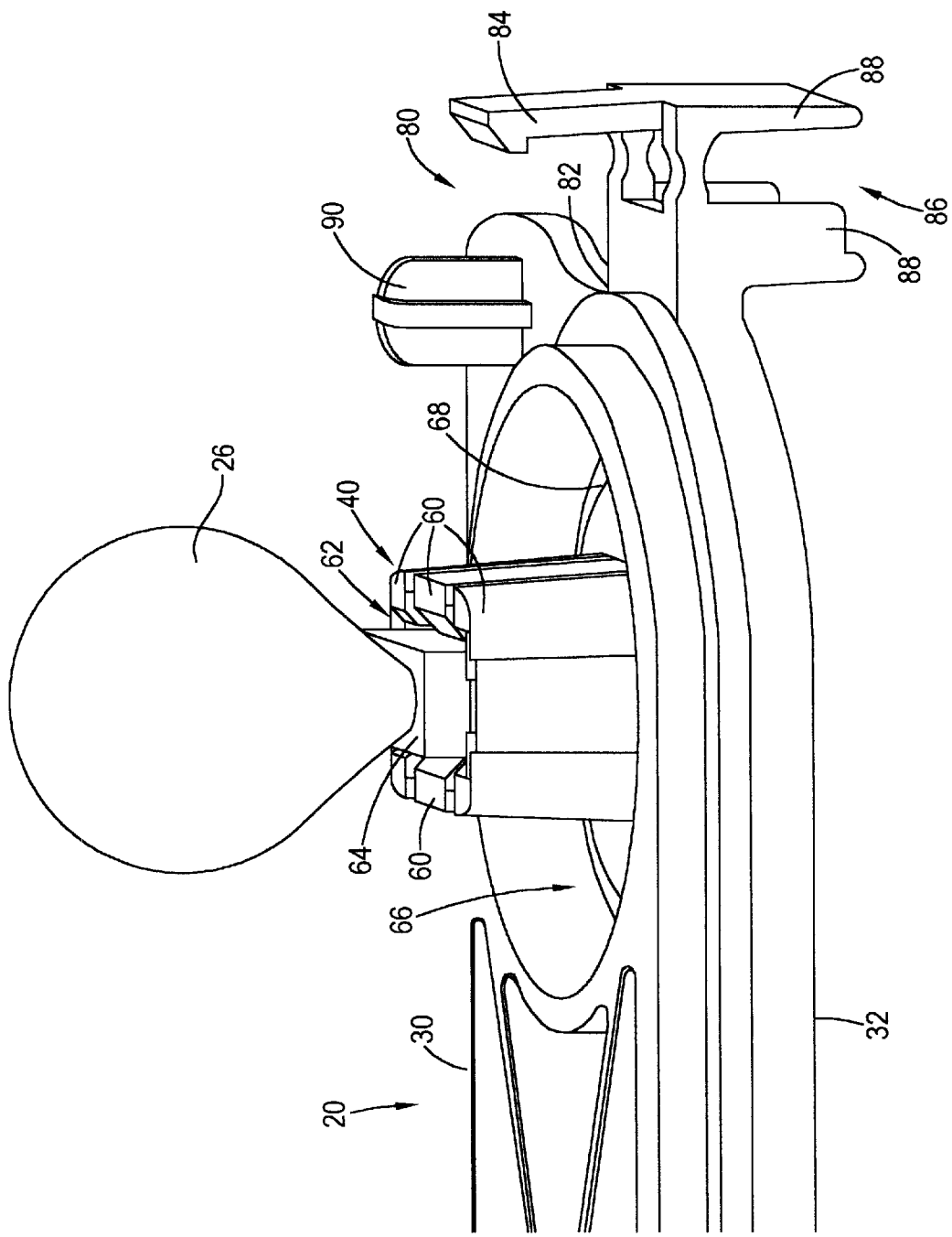
FIG. 4 is a view of a right side of the backplate illustrated in FIGS. 1–3, showing a bulb engaged in a bulb socket on the backplate upper.

As shown in FIGS. 3 and 4, each bulb socket 36, 38, 40 preferably includes a plurality of walls 60 which are spaced apart and arranged to form an opening 62 for receiving an electrical contact portion 64 of a corresponding bulb. While FIGS. 1–3 show a backplate 20 which is configured to hold three bulbs, other configurations are possible. Preferably, each bulb socket 36, 38, 40 is disposed in a corresponding recess 66 in the backplate upper 30, and a sealing member 68 is disposed in each recess 66. As will be described more fully later herein, the backplate 20 is configured for engagement with a rear lamp housing. The sealing members 68 which are in the recesses 66, proximate the bulb sockets 36, 38, 40, are configured to seal with the rear lamp housing in order to form a watertight seal and prevent moisture from leaking into the rear lamp housing. As such, condensation in the lamp lens is prevented. Preferably, the sealing members 68 provide a 2 p.s.i. seal with the rear lamp housing.

As shown in FIG. 3, the leadframe 34 also includes extensions 50 which are configured for engagement with the wire harness 42 (see FIG. 2) (and more specifically with electrical contacts therein). Preferably, the extensions 50 are configured to extend into the receptacle 44 on the backplate lower 32. Preferably, the receptacle 44, extensions 50 and wire harness 42 are configured such that when the electrical contacts in the wire harness 42 are engaged with the extensions 50 in the receptacle 44, the wire harness 42 is generally securely retained in the receptacle 44. To disengage the wire harness 42 from the extensions 50 on the leadframe 34, one merely needs to pull the wire harness 42 out of the receptacle 44.

As shown in FIG. 2, the receptacle 44 on the backplate lower 32 is formed of a wall 70 which extends from surface 72. The wall 70 forms an opening 74 which receives the wire harness 42 such that electrical contacts in the wire harness 42 conductively engage the extensions 50 of the leadframe 34 which extend into the receptacle 44. As shown in FIGS. 1–5, the backplate lower 32 also includes clips 80 at ends 82 of the backplate lower 32 for engaging a rear lamp housing. Preferably, the clips 80 provide for a snap-fit engagement with the rear lamp housing. As shown, each of the clips 80 may include a hook portion 84 that engages corresponding structure on the rear lamp housing, and each of the clips 80 may include a finger-engaging portion 86 which is configured to be engaged by a person's fingers to pivot the hook portion 84 away from the corresponding structure in the rear lamp housing such that the backplate 20 can be readily disengaged or removed from the rear lamp housing. Subsequently, any of the bulbs 22, 24, 26 can be replaced by pulling the bulb from its respective bulb socket 36, 38, 40 and replacing the bulb with a fresh bulb.

As shown, the finger-engaging portion 86 of the clips 80 may consist of a pair of spaced-apart walls 88 which are configured to be urged together to cause resulting pivoting of the hook portion 84 of the clip. Of course, other structure for the clips 80 can be employed as an alternative to the hook portion 84 and finger-engaging portion 86.

As shown in FIGS. 1–5, the backplate lower 32 may also include other structure for engaging the rear lamp housing. Specifically, the backplate lower 32 may include extensions 90 which are configured to be received in corresponding recesses or apertures in the rear lamp backplate. The engagement between the extensions 90 and the rear lamp housing provides for better alignment with regard to the intended position of the backplate 20 on the rear lamp housing, and provides for a more reliable securement.

Figure 5:
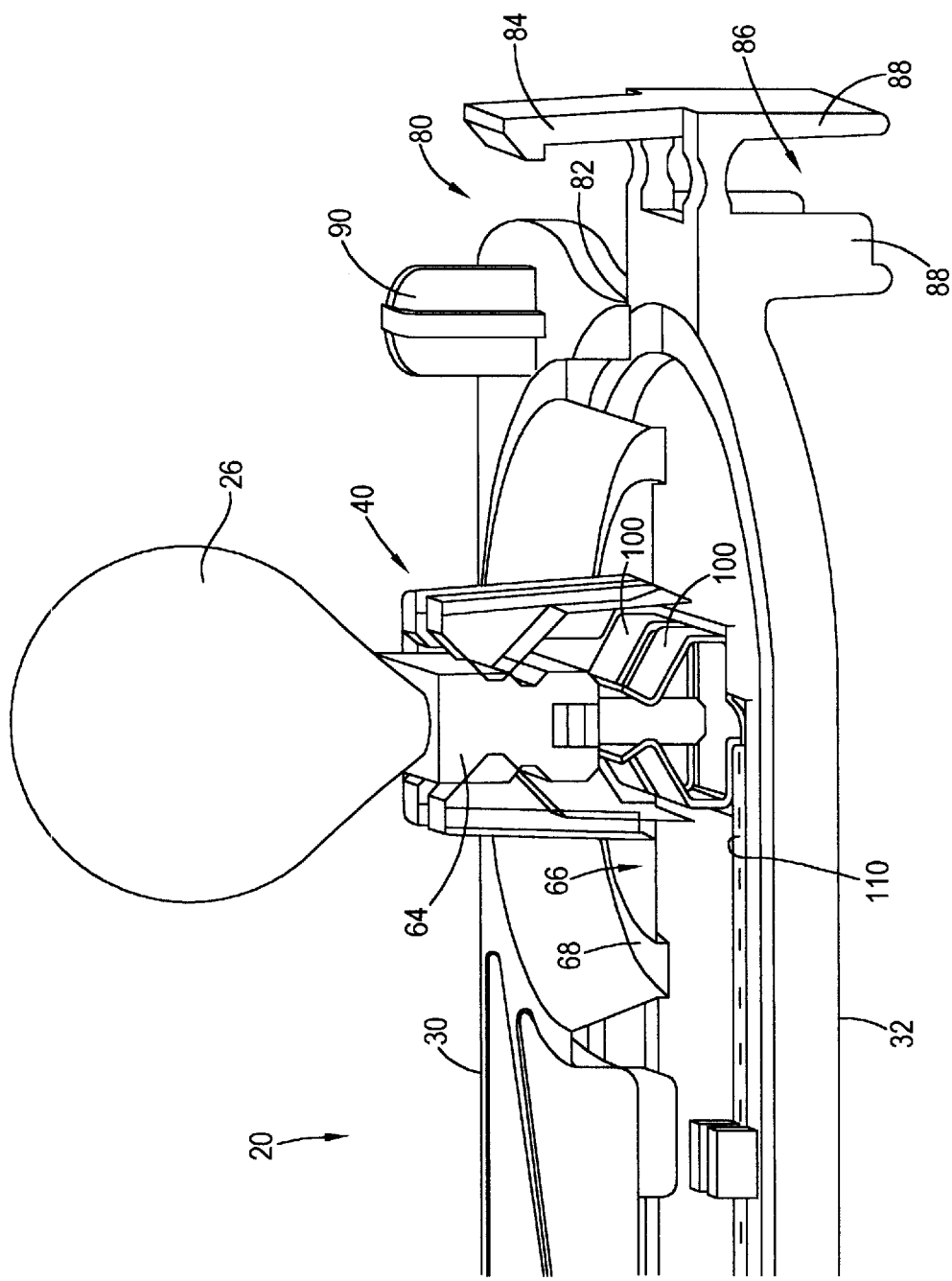
FIG. 5 is a view similar to FIG. 4, but showing engagement of the bulb with clips of the leadframe which is sandwiched between the upper and backplate lowers.

As shown in FIG. 3, preferably the leadframe 34 includes clips 100 for engaging the bulbs 22, 24, 26 which are received in the bulb sockets (see also FIG. 5). The clips 100 conductively engage the electrical contact portions 64 of the bulbs. Additionally, as shown in FIG. 5, the clips 100 are configured to frictionally engage the electrical contact portion 64. Hence, the clips 100 conductively engage and frictionally engage the bulbs. As shown in FIG. 3, preferably two clips 100 are provided for each bulb. More specifically, as shown in FIG. 5 with regard to the right-most bulb socket 40 (the others are similar), preferably two clips 100 are disposed in each bulb socket 40 for engagement with a corresponding bulb. Preferably, the clips 100 are configured such that when a bulb is engaged with the clips 100, the bulb is securely engaged therewith such that the bulb is securely retained in the respective bulb socket. To disengage the bulb 26 from the clips 100 and remove the bulb 26 from the bulb socket 40 (such as to replace the bulb 26), one merely needs to pull the bulb 26 out of the bulb socket 40.

As discussed above, the leadframe 34 is configured to conductively engage both the bulbs 22, 24, 26 and the electrical wires 46 of the wire harness 42 to provide an electrical connection between the electrical wires 46 and the bulbs 22, 24, 26. To this end, as shown in FIG. 3, the leadframe 34 includes leads 110 which effectively interconnect the clips 70 and the extensions 50.

As discussed above, while the backplate 20 illustrated in FIGS. 1–3 is configured for carrying three bulbs, other configurations are possible. In fact, FIGS. 6–8 illustrate a similar backplate 20a which is configured to carry a single bulb 22a. Because the two backplates, 20 and 20a, are so similar, the same reference numerals are used to identify corresponding parts, and the alphabetic suffix "a" is added. For clarity, a detailed description of some corresponding parts is omitted with the understanding that one may review the above description of the first backplate (20).

Like the backplate 20 shown in FIGS. 1–3, the backplate 20a shown in FIGS. 6–8 is comprised of three parts—a backplate upper 30a, a backplate lower 32a and a leadframe 34a, and the backplate upper 30a and backplate lower 32a are secured together with the leadframe 34a sandwiched therebetween. As shown in FIGS. 6 and 7, the backplate lower 32a includes a receptacle 44a for receiving a wire harness 42a (see specifically FIG. 7), and, as shown in FIGS. 7 and 8, the backplate upper 30a, instead of having three bulb sockets, has only a single bulb socket 36a. Preferably, the bulb socket 36a is disposed in a recess 66a, and a sealing member 68a is disposed in the recess 66a. The leadframe 34a provides a pair of clips 100a which are disposed in the bulb socket 36a and engage the electrical contact portion of the bulb. As shown in FIG. 6, the leadframe 34a also provides extensions 50a which extend into the receptacle 44a to engage electrical contacts in the wire harness 42a. As shown in FIGS. 6–8, the backplate lower 32a (like the backplate lower 32 of the backplate illustrated in FIGS. 1–3) includes clips 80a and protrusions 90a configured to engage a rear lamp housing. As in the backplate 20 illustrated in FIGS. 1–3, the backplate 20a illustrated in FIGS. 6–8 provides that the leadframe 34a conductively and electrically connects the electrical wires 46a of the wire harness 42a to the bulb 22a installed in the bulb socket 36a.

Figure 9:
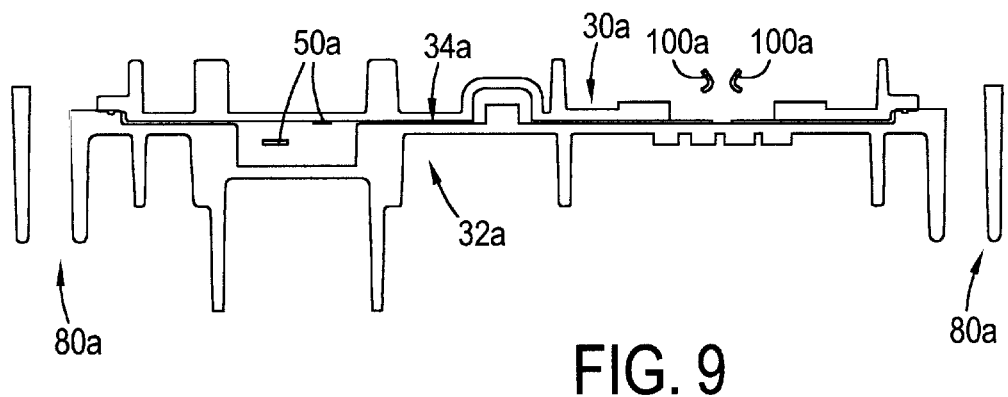
FIG. 9 is a cross-sectional view of the backplate illustrated in FIGS. 6–8, taken along line 9—9 of FIG. 8.
Figure 10:
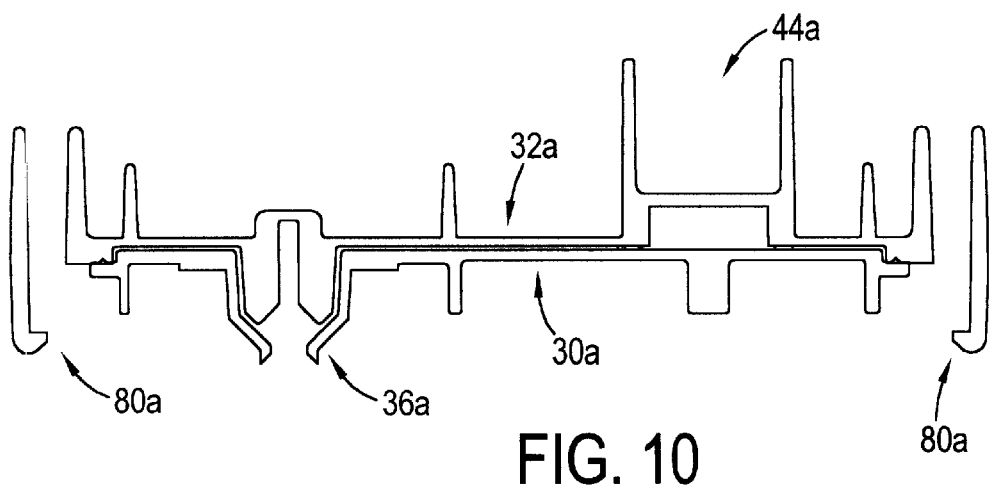
FIG. 10 is a cross-sectional view of the backplate illustrated in FIGS. 6–8, taken along line 10—10 of FIG. 8.
Figure 11:
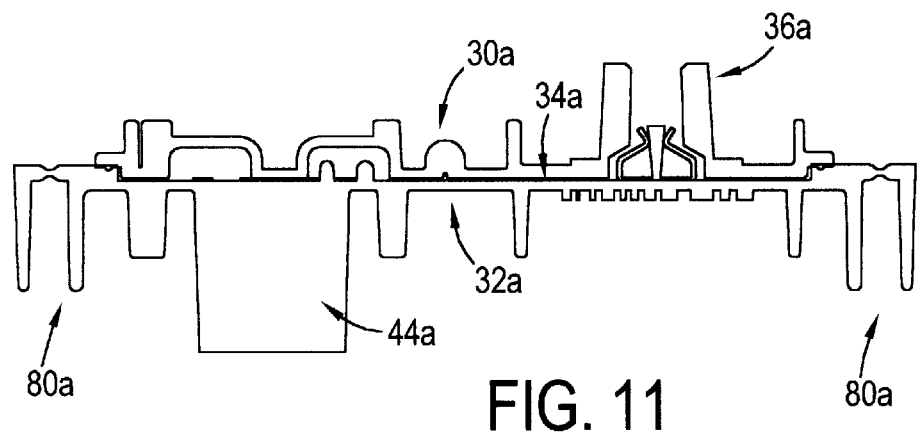
FIG. 11 is a cross-sectional view of the backplate illustrated in FIGS. 6–8, taken along line 11—11 of FIG. 8.
Figure 12:
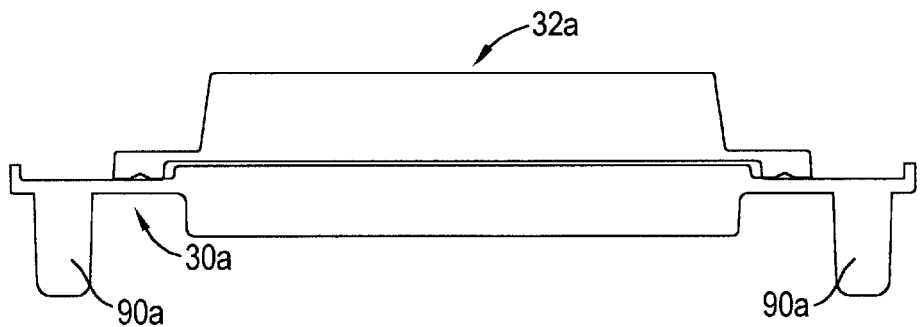
FIG. 12 is a cross-sectional view of the backplate illustrated in FIGS. 6–8, taken along line 12—12 of FIG. 8.
Figure 13:
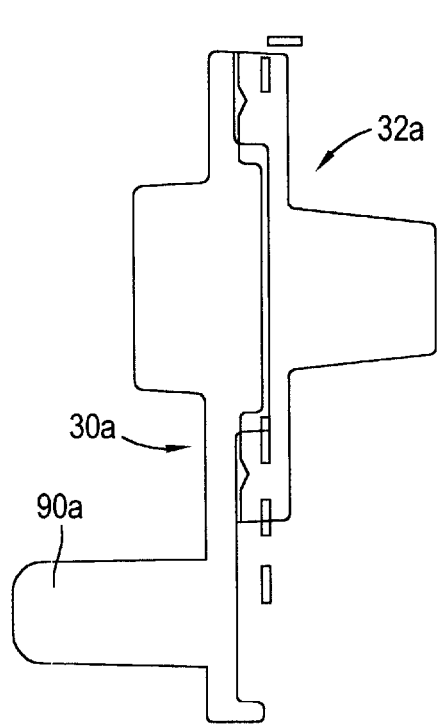
FIG. 13 is a cross-sectional view of the backplate illustrated in FIGS. 6–8, taken along line 13—13 of FIG. 8.
Figure 14:
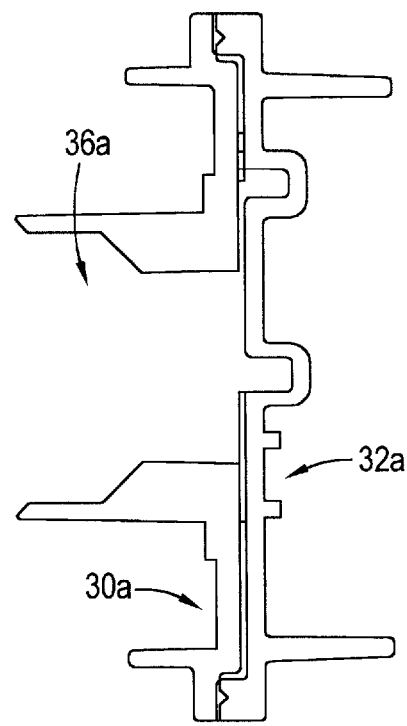
FIG. 14 is a cross-sectional view of the backplate illustrated in FIGS. 6–8, taken along line 14—14 of FIG. 8.

FIGS. 9–14 illustrate several different cross-sectional views of the backplate 20a illustrated in FIGS. 6–8 and are self-explanatory. Each of the views are taken along a line of FIG. 8. Specifically, FIG. 9 is taken along line 9—9, FIG. 10 is taken along line 10—10, FIG. 11 is taken along line 11—11, etc., etc.

Each of the backplates illustrated and described provides one or more bulb sockets which are integral with the backplate, and each provides that the backplate can be readily and selectively engaged and disengaged from a rear lamp housing. Providing that the bulb sockets are integral with the backplate provides for a simpler design by combining bulb retention and electrical contact with the leadframe. Additionally, all bulb socket features (i.e., bulb location, insertion/removal efforts) are executed via a simple three piece "sandwich" of backplate upper, backplate lower and leadframe. Moreover, each backplate snap-fits to the rear lamp housing simplifying bulb servicing while providing a 2 p.s.i. seal at each individual socket.

While embodiments of the present invention are shown and described, it is envisioned that those skilled in the art may devise various modifications without departing from the spirit and scope of the present invention.

What is claimed is:

1. A lighting backplate configured to receive a wire harness and at least one light bulb, said lighting backplate comprising: a backplate upper member; a backplate lower member which is engaged with said backplate upper member; a lead frame disposed between said backplate lower member and said backplate upper member, said backplate lower member including a receptacle configured to receive the wire harness, said backplate upper member including at least one integral bulb socket which is configured to receive the light bulb, said lead frame configured to conductively engage the light bulb when said light bulb is engaged in said integral bulb socket and is configured to conductively engage the wire harness when the wire harness is engaged in the receptacle on said backplate lower member, wherein said backplate is configured for selective engagement and disengagement from corresponding support structure and includes at least one clip for securing said lighting backplate.

2. A lighting backplate as recited in claim 1, wherein said lead frame includes clips configured to conductively engage the light bulb when the light bulb is received in said integral bulb socket.

3. A lighting backplate as recited in claim 2, wherein said clips are disposed generally in said integral bulb socket.

4. A lighting backplate as recited in claim 1, wherein said lead frame is generally encapsulaled between said backplate lower member and said backplate upper member.

5. A lighting backplate as recited in claim 4, wherein said lead frame is exposed only in said at least one integral bulb socket and said receptacle.

6. A lighting backplate as recited in claim 1, wherein said backplate is configured to provide a sealing surface around each light bulb for sealing with the corresponding support structure when the backplate is engaged therewith.

7. A lighting backplate as recited in claim 1, wherein said backplate lower member does not include an aperture for receiving said light bulb.

8. A lighting backplate as recited in claim 1, wherein each integral bulb socket comprises a plurality of walls which are spaced apart and arranged to form an opening.

9. A lighting backplate as recited in claim 1, wherein said lead frame includes extensions configured to conductively engage electrical contacts of the wire harness when the wire harness is engaged in the receptacle in said backplate lower member.

10. A lighting backplate as recited in claim 1, wherein said backplate upper member includes a surface, and said receptacle comprises a wall which extends from said surface to define an opening.

11. A lighting backplate comprising: a backplate upper member including at least one integral bulb socket; a backplate lower member which is engaged with said backplate upper member and including a receptacle; a lead frame disposed between said backplate lower member and said backplate upper member and being generally encapsulated between said backplate lower member and said backplate upper member, said lead frame being exposed only in said at least one integral bulb socket and said receptacle, wherein said integral bulb socket does not extend to said backplate lower member.

12. A lighting backplate as recited in claim 11, wherein said lighting backplate is configured to receive a wire harness and at least one light bulb, wherein said receptacle is configured to receive the wire harness and said at least one integral bulb socket is configured to receive said at least one light bulb, said lead frame configured to conductively engage the light bulb when said light bulb is engaged in said integral bulb socket and is configured to conductively engage the wire harness when the wire harness is engaged in the receptacle on said backplate lower member.

13. A lighting backplate as recited in claim 12, wherein said lead frame includes clips configured to conductively engage the light bulb when the light bulb is received in said integral bulb socket.

14. A lighting backplate as recited in claim 13, wherein said clips are disposed generally in said integral bulb socket.

15. A lighting backplate as recited in claim 11, wherein said backplate is configured for selective engagement and disengagement from corresponding support structure.

16. A lighting backplate as recited in claim 15, wherein said backplate includes at least one clip for securing said lighting backplate.

17. A lighting backplate as recited in claim 11, wherein said backplate lower member does not include an aperture for receiving said light bulb.

18. A lighting backplate as recited in claim 11, wherein each integral bulb socket comprises a plurality of walls which are spaced apart and arranged to form an opening.

19. A lighting backplate as recited in claim 12, wherein said lead frame includes extensions configured to conductively engage electrical contacts of the wire harness when the wire harness is engaged in the receptacle in said backplate lower member.

20. A lighting backplate as recited in claim 11, wherein said backplate upper member includes a surface, and said receptacle comprises a wall which extends from said surface to define an opening.

21. A lighting backplate configured to receive a wire harness and at least one light bulb, said lighting backplate comprising: a backplate upper member; a backplate lower member which is engaged with said backplate upper member; a lead frame disposed between said backplate lower member and said backplate upper member, said backplate lower member including a receptacle configured to receive the wire harness, said backplate upper member including at least one integral bulb socket which is configured to receive the light bulb, said lead frame configured to conductively engage the light bulb when said light bulb is engaged in said integral bulb socket and is configured to conductively engage the wire harness when the wire harness is engaged in the receptacle on said backplate lower member, wherein said backplate lower member does not include an aperture for receiving said light bulb.

22. A lighting backplate as recited in claim 21, wherein said lead frame includes clips configured to conductively engage the light bulb when the light bulb is received in said integral bulb socket.

23. A lighting backplate as recited in claim 22, wherein said clips are disposed generally in said integral bulb socket.

24. A lighting backplate as recited in claim 21, wherein said lead frame is generally encapsulated between said backplate lower member and said backplate upper member.

25. A lighting backplate as recited in claim 24, wherein said lead frame is exposed only in said at least one integral bulb socket and said receptacle.

26. A lighting backplate as recited in claim 21, wherein said backplate is configured for selective engagement and disengagement from corresponding support structure.

27. A lighting backplate as recited in claim 26, wherein said backplate includes at least one clip for securing said lighting backplate.

28. A lighting backplate as recited in claim 26, wherein said backplate is configured to provide a sealing surface around each light bulb for sealing with the corresponding support structure when the backplate is engaged therewith.

29. A lighting backplate as recited in claim 21, wherein each integral bulb socket comprises a plurality of walls which are spaced apart and arranged to form an opening.

30. A lighting backplate as recited in claim 21, wherein said lead frame includes extensions configured to conductively engage electrical contacts of the wire harness when the wire harness is engaged in the receptacle in said backplate lower member.

31. A lighting backplate as recited in claim 21, wherein said backplate upper member includes a surface, and said receptacle comprises a wall which extends from said surface to define an opening.

* * * * *